Nov. 3, 1942.  W. McKAY  2,300,685
UNIVERSAL FLIGHT INSTRUMENT
Filed March 13, 1940    4 Sheets-Sheet 1

INVENTOR.
WALTER McKAY
BY Joseph H. Lipschutz
ATTORNEY.

Nov. 3, 1942.    W. McKAY    2,300,685
UNIVERSAL FLIGHT INSTRUMENT
Filed March 13, 1940    4 Sheets-Sheet 2

INVENTOR.
WALTER McKAY
BY Joseph H. Lipschutz
ATTORNEY.

Nov. 3, 1942.  W. McKAY  2,300,685
UNIVERSAL FLIGHT INSTRUMENT
Filed March 13, 1940   4 Sheets-Sheet 3

INVENTOR.
WALTER McKAY
BY Joseph H. Lipschutz
ATTORNEY.

Nov. 3, 1942.  W. McKAY  2,300,685
UNIVERSAL FLIGHT INSTRUMENT
Filed March 13, 1940  4 Sheets-Sheet 4

ANGULAR ACCEL. {PENDULOUS TORQUE / MOVEMENT OF INERTIA} WHEN CARD EXACTLY 90° OFF MERIDIAN NO COMPONENT ABOUT H. HENCE NO TENDENCY TO SETTLE

RESULTANT EARTH'S MAGNETIC FIELD

INVENTOR.
WALTER McKAY
BY Joseph H. Lipschutz
ATTORNEY.

Patented Nov. 3, 1942

2,300,685

UNITED STATES PATENT OFFICE 2,300,685

UNIVERSAL FLIGHT INSTRUMENT

Walter McKay, New York, N. Y., assignor to Sperry Products, Inc., Hoboken, N. J., a corporation of New York Application March 13, 1940, Serial No. 323,662

2 Claims. (Cl. 33—223)

This invention relates to universal flight indicators which may be magnetic compasses or attitude of flight indicators, such as artificial horizons or similar instruments of the general type disclosed in the copending application of Elmer A. Sperry, Jr., Serial No. 140,650, filed May 4, 1937.

All such instruments comprise a sensitive element which must be stabilized in a given plane in order to give a useful indication. Thus, for instance, in the case of an artificial horizon or a magnetic compass, it is essential that the sensitive element be stabilized in the horizontal plane so that the reference horizon or an indication in azimuth may be obtained. It is this necessity for stabilizing the sensitive element in the horizontal plane which requires the use of pendulous elements, but necessarily, therefore, acceleration forces acting upon said pendulous elements give rise to very substantial acceleration errors. For this reason it was proposed in the said application of Elmer A. Sperry, Jr., that the sensitive element shall consist of an inertia element in the form of a float pivotally mounted against a fixed pivot, the said float having its center of gravity and center of buoyancy carefully adjusted to coincide with the center of pivotal movement of the float on said pivot. A small pendulum was then added to the float, the said pendulous factor being just sufficient to cause the float to settle against the friction of its bearing, and hence the acceleration forces acting upon the said inertia element would be held to a minimum. It was further proposed that the pendulum be rigidly connected to the float only within narrow limits of movement and thereafter the connection between the pendulum and the float become loose or yielding so that further displacement of the pendulum would not result in further displacement of the float.

In the said Elmer A. Sperry, Jr., application there was disclosed an instrument which was provided with means whereby a slow period around the vertical or Z axis was obtained. In this way the instrument was rendered unresponsive to small and short period disturbing forces acting around the vertical axis. It is the principal object of this invention to provide an instrument of the class described which will provide a sensitive element which is substantially unresponsive to small and short period disturbing forces acting around the horizontal axes, that is, the X and Y axes. One of the consequences of this construction, as will be more fully explained hereinafter, is that thereby there is also obtained the result heretofore obtained in the Elmer A. Sperry, Jr., application, namely, that of a slow period action around the vertical axis, while the long period around the X and Y axes makes the instrument particularly useful as an artificial horizon or attitude-of-flight indicator.

It is a further object of this invention to obtain the results specified above by the use of a sensitive element which will have a minimum of displacement and which will therefore have a minimum of buoyancy variation in response to variations in temperature.

Further objects and advantages of this invention will become apparent in the following detailed description thereof.

Figure 1:
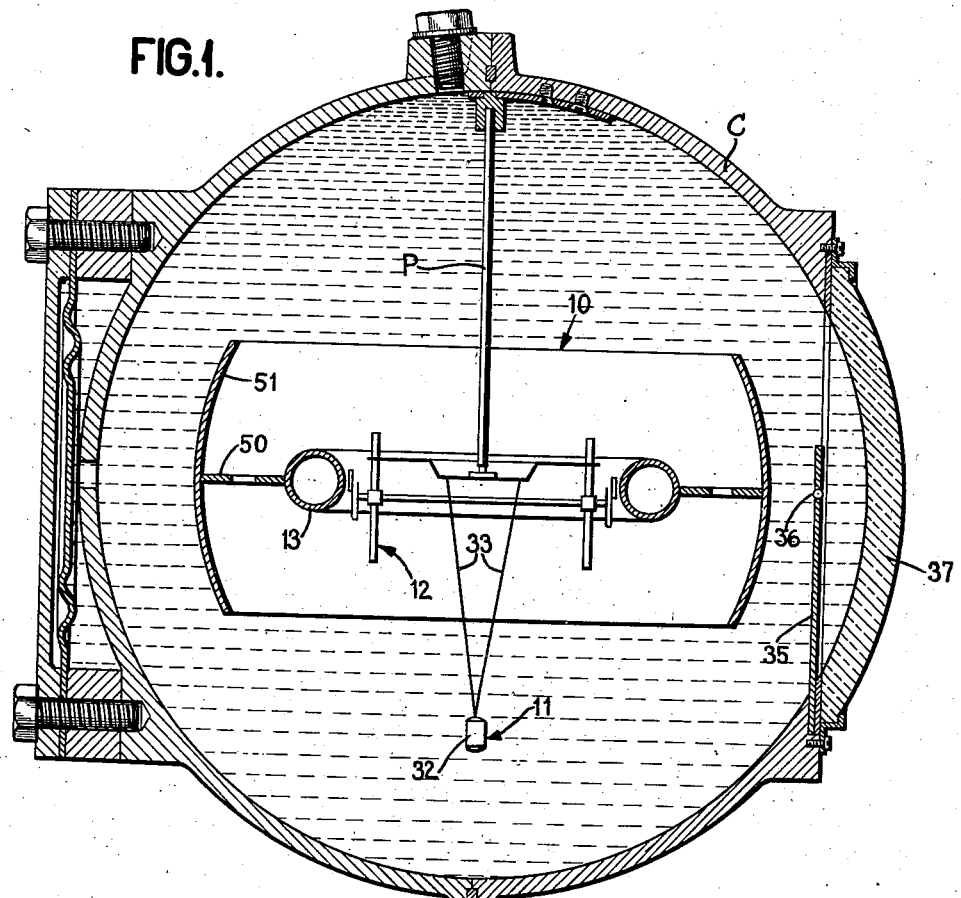
Fig. 1 is a vertical section through a universal flight instrument, in this case a magnetic compass, embodying my invention.
Figure 2:
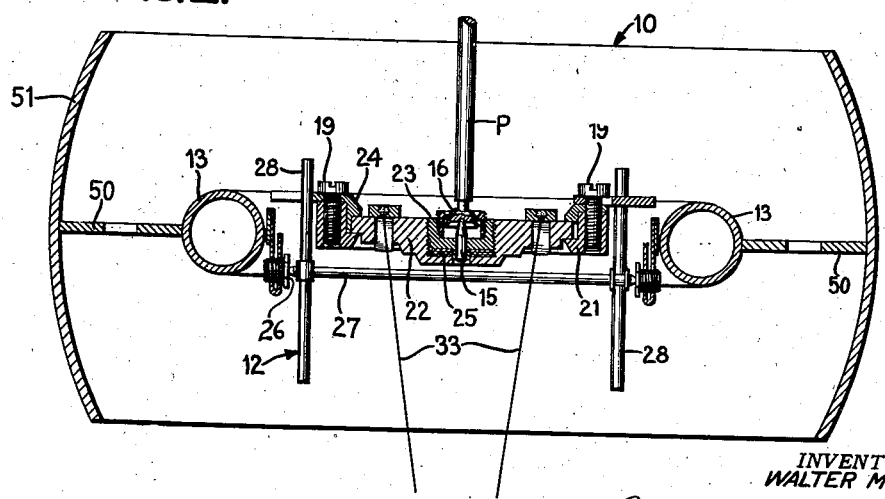
Fig. 2 is an enlarged detail of the sensitive element of the Fig. 1 device.
Figure 3:
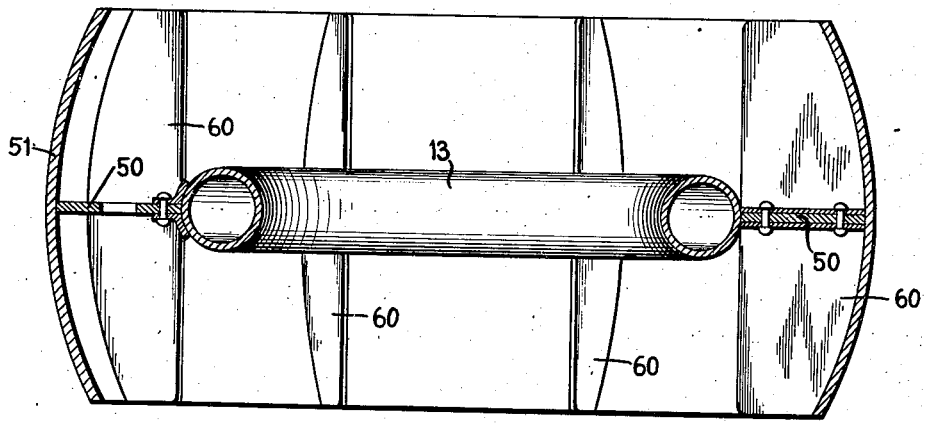
Fig. 3 is a view similar to Fig. 2, with parts removed, showing a modified form of my invention.
Figure 4:
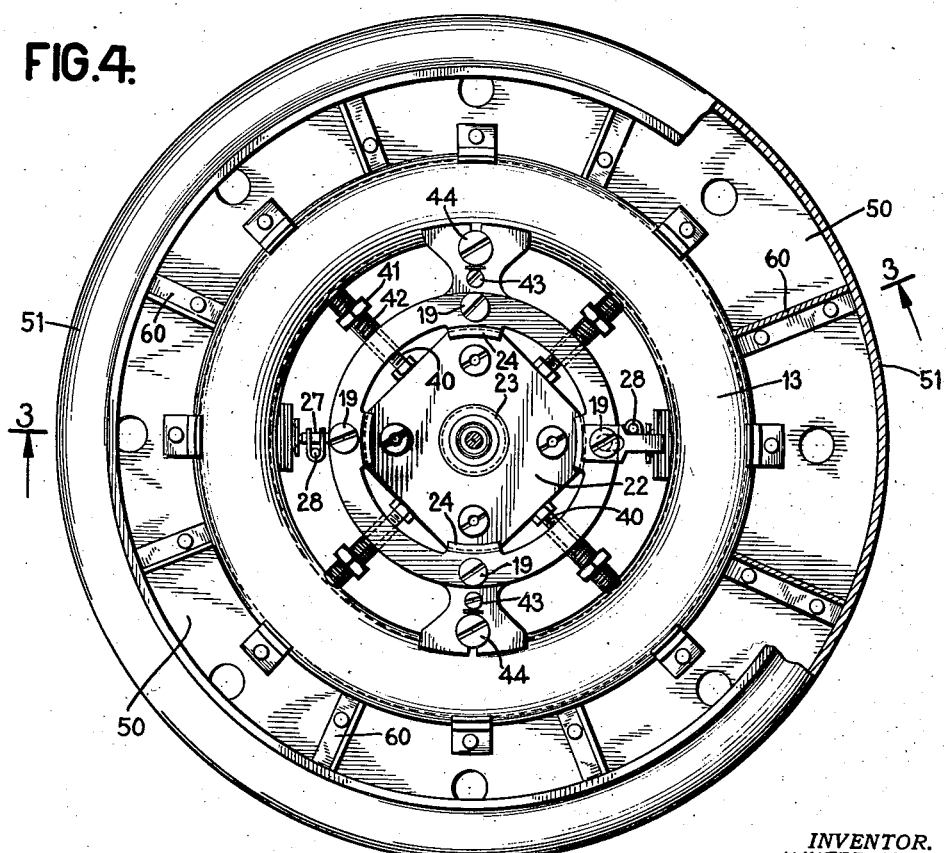
Fig. 4 is a plan view of the form of invention disclosed in Fig. 3.

Figs. 5 to 12 inclusive are a series of diagrams explaining the theory involved in the form of invention disclosed in Figs. 1 and 2.

In Figs. 1 and 2 I have illustrated my invention as applied to a magnetic compass, but it will be understood that the invention applies quite generally to universal flight instruments in which a given plane is to be maintained by a physical pendulum. The magnetic compass shown consists of an inertia or magnetic element 10 and a pendulous element 11. The inertia or magnetic element consists of a magnet system 12 and a float 13 upon which the magnet system is supported. The float may be toroidal in form and provide the necessary buoyancy. The float and the mechanism which it supports are supported by the pivot 15 resting against the jewel 16 in the bottom of a pivot post P which is fixed within a casing C which is filled with fluid. Within the inner circumference of the float there is mounted a supporting flange 21 which supports a plate 22 carrying the pivot. The said pivot is fitted into a socket 23 which is in turn screwed into the supporting plate, and the height of the pivot point may be adjusted by means of shims 25 interposed between the bottom of the socket and the supporting plate. It will be seen that by means of this adjustment the center of the pivot may be brought into predetermined relationship vertically with the center of gravity and center of buoyancy of the sensitive element. For this purpose, also, a lateral adjustment of the plate on the supporting flange is provided, an upper flange 24 being provided so that the plate may move laterally between top and bottom members and may be locked in adjusted position by screws 19. The lateral adjustment of the plate on the supporting flange may be accomplished by means of four adjusting screws 40 arranged in quadrature. This adjustment, together with the vertical adjustment by means of shims, enables the center of buoyancy of the sensitive element thus far described to be brought into any desired relationship with the center of pivotal movement. For adjusting the center of gravity to cause the same to be brought into the desired relationship with the center of pivotal movement, there may be provided the set of weights 41 arranged in quadrature on screws 42 so that the center of gravity of the plate may be adjusted laterally in any direction. For adjusting the center of gravity vertically, there may preferably be provided two sets of vertically adjustable screws 43 and 44, the first set of screws being small in weight and providing the fine adjustment, while the screws of the second set are relatively large in weight and provide the coarse vertical adjustment.

Also supported in the said inner circumference of the toroidal float are bearings 26 in which is journaled the shaft 27 carrying the magnets 28 adjacent to its opposite ends so that said magnets are free to take up their natural angle of dip. Stops limit the movement of the magnets to less than 180 degrees.

The pendulous element may consist of a small weight 32 suspended by threads 33 from the plate to which said threads are attached. The threads form a cone which is rigid within a few degrees of displacement, but when the acceleration forces exceed a predetermined degree, certain of the threads pivot around their point of attachment, while others of the threads become loose, so that no further increase in torque is applied to the sensitive element by the pendulous element.

The sensitive element as thus far described would have very little inertia and therefore would respond quickly to all disturbing forces, even those of small magnitude and short duration, and thus the sensitive element would provide a very indefinite base-line for the purposes of indicating attitude of flight or position. In order to render the sensitive element insensitive to such small or short period disturbing forces, I provide means for substantially increasing the inertia of the element around all horizontal axes without, however, substantially increasing the volume displacement of said element and therefore without rendering said element subject to wide variations in buoyancy in response to variations in temperature. Since the buoyant force is directly proportional to the volume displaced by the sensitive element, wide variations in buoyancy may be so substantial as to cause sticking of the pivot in its bearing and hence prevent proper functioning of the instrument.

The increase in inertia around the horizontal axes is effected by means of a horizontal baffle 50 extending between the outer circumference of the toroidal float and an outer wall 51 in the form of a section of a sphere. The said outer wall may carry on its outer surface the indicia which may be read through the front window 37 of the casing with respect to vertical and horizontal lubber lines 35 and 36. The effect of the construction just described is to trap large quantities of the liquid which fills the casing between the upper and lower surfaces of the horizontal baffle 50 and the outer wall 51, so that any movement of the sensitive element around any horizontal axis will cause a substantial quantity of the liquid to be moved bodily therewith and thus substantially increase the inertia of said element. This increase in inertia is obtained without increasing the buoyancy of the sensitive element except for the volume displaced by the thickness of material of which baffle 50 and wall 51 are composed. Such a sensitive element will not respond to small or short period disturbing forces acting around horizontal axes, and thus a stable horizontal base-line is obtained with respect to which the horizontal lubber line 36 may be read to indicate movements of the craft upon which said instrument is mounted around any horizontal axis.

The instrument thus described may be employed without the magnets for the purpose of indicating climb or inclination. I may render such instrument useful, also, as a turn indicating instrument or as an instrument to indicate straight flight, by merely adding to the horizontal baffle just described a plurality of vertical baffles 60 also arranged between the said outer wall 51 and the outer circumference of the toroidal float. Any movements around the vertical axis would also tend to move bodily large masses of liquid contained between adjacent vertical baffles and the outer wall. In this way the float would tend to maintain its position in azimuth, and movements of the craft around a vertical axis would be indicated, as well as movements of the craft around horizontal axes. In each case the instrument would be insensitive to small and short duration forces operating around the respective axes.

Figure 5:
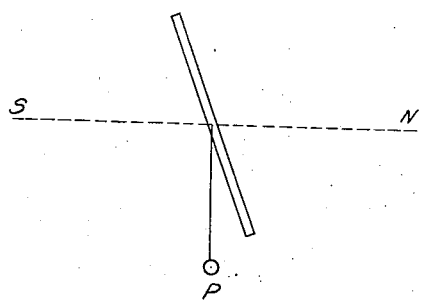
Figure 6:
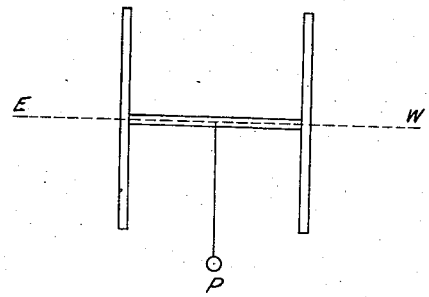
Figure 7:
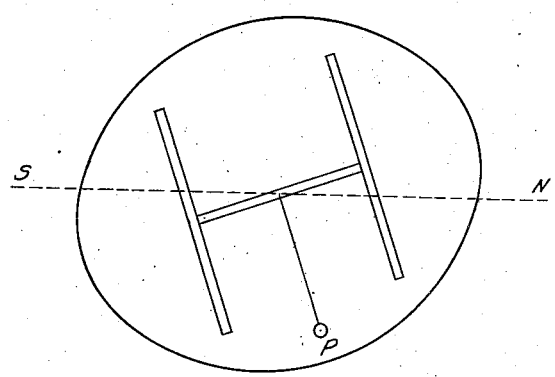
Figure 8:
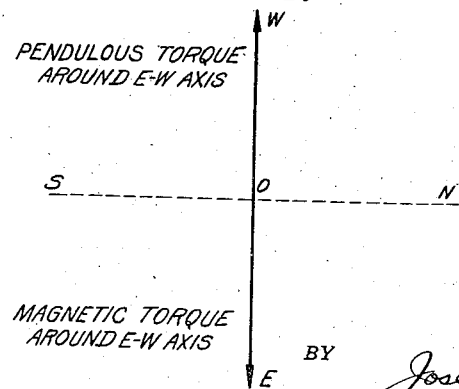
Figure 9:
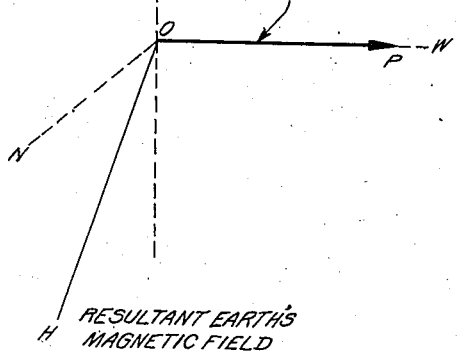
Figure 10:
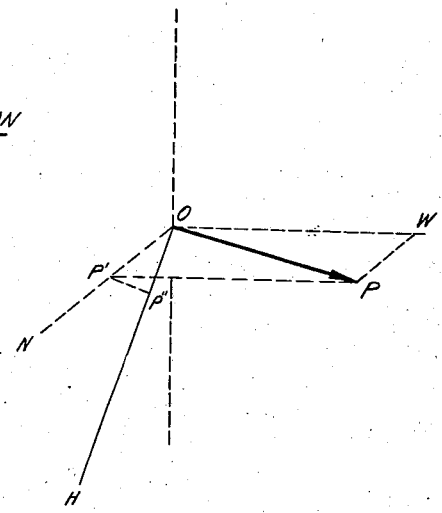
Figure 11:
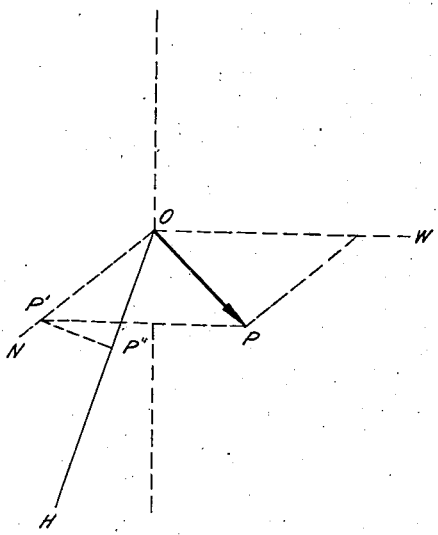
Figure 12:
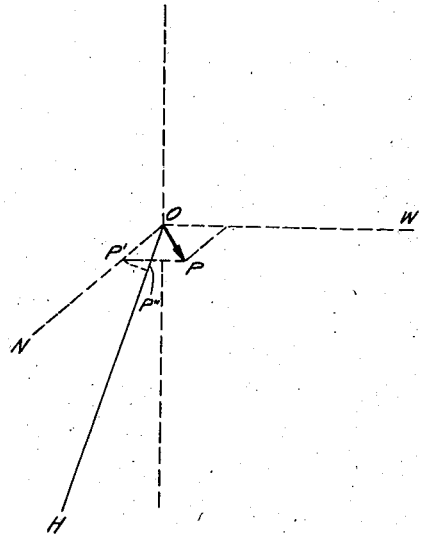

If, in addition to the horizontal baffle described in connection with Figs. 1 and 2, there is employed one or more magnetic elements such as the magnets mounted on the shaft shown and described in connection with Fig. 2, then there will result a magnetic compass which is not only stable around the horizontal axes so that it may also be used as an artificial horizon, but also the unobvious result that a magnetic compass with a long period around the vertical axis is obtained. The reason for this is disclosed in the series of diagrams, Figs. 5 to 12, inclusive. If a magnet system which is free to assume its natural angle of dip, as shown in Fig. 5, is turned through 90° about the vertical as shown in Fig. 6, then the compass system will tilt almost into the natural angle of dip as shown in Fig. 7. The magnets and the compass element on which they are supported do not quite tilt into the resultant earth's magnetic field because of the fact that the pendulum exerts a torque in the opposite direction. However, since the pendulous element is small, the magnetic element will move substantially into the resultant earth's magnetic field until a balance is struck between the pendulous torque around the E-W axis (the axis perpendicular to the paper in Fig. 7) and the magnetic torque acting around said E-W axis. There is thus obtained a position of equilibrium as indicated in the vector diagram, Fig. 8, wherein the vector OE, the magnetic torque, is just balanced by the vector OW, the pendulous torque. The relation of the pendulous torque vector OW to the direction of the earth's field for this 90° equilibrium position is shown in the three dimensional vector diagram of Fig. 9. However, this is a condition of unstable equilibrium and once disturbed from this position by small extraneous forces, the card tends to settle back on the magnetic meridian as shown in Figs. 10-12 inclusive. Fig. 10 is a vector diagram showing the pendulous torque acting when the card is slightly less than 90° from the meridian. The total pendulous torque OP is seen to have a component OP'' along OH, the resultant earth's field. This is the only component of pendulous torque which can rotate the card, because all other components are quickly balanced out by the magnetic torque. This component of torque OP'' causes the card to rotate about OH always in a direction so as to settle the card on the meridian, in which position the card will be level and the vector OP will be reduced to zero. Figs. 11 and 12 are vector diagrams showing change in the pendulous torque vector and its projection along OH as the card settles toward the meridian. It will be apparent from the above that the restoration of the magnet system to its original settling position is a function of the pendulosity since only the component of the pendulous torque along OH can rotate the card. Now, the undamped period of a physical pendulum is given by the formula $$T = 2\pi \sqrt{\frac{I}{mgl}}$$

where $mgl$ is the pendulosity and $I$ the moment of inertia about a horizontal axis. In the case of the settling compass, $I$ is the moment of inertia about the card axis OH which is an axis between the horizontal and the vertical. Hence, the effective moment of inertia acting when the compass card settles depends on the moment of inertia about the vertical axis as well as that about the horizontal. Thus, the settling period may be further increased by employing the vertical vanes 60 which will increase the inertia about said vertical axis. This is above and beyond the settling period derived solely from the moment of inertia about the horizontal.

Thus it will be seen that in a compass where the magnets are pivotally mounted so that they may assume their natural angle of dip, the restoring period, or, in other words, the period in azimuth, is inversely proportional to the square root of the pendulosity. Therefore the small pendulum will result in a long period. Since the small pendulum was also responsible for the long period around the horizontal axes, it will be seen that a magnetic compass element having a long period around the horizontal axes will, if the magnets are pivoted to permit them to assume their natural angle of dip, have a long period around the vertical axis.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a direction indicator for dirigible craft, a casing containing liquid, a pivot supported in said casing, a sensitive element mounted on said pivot and comprising an inertia member including a magnetic member pivotally mounted thereon so that it may assume its natural angle of dip, and a pendulous member supported on said inertia member, said inertia member comprising an inner float, an outer indicia carrying wall spaced from said float, and a horizontal vane connecting said float and said wall and substantially closing the space between said float and said wall.

2. In a direction indicator for dirigible craft, a casing containing liquid, a pivot supported in said casing, a sensitive element mounted on said pivot and comprising an inertia member including a magnetic member pivotally mounted thereon so that it may assume its natural angle of dip, and a pendulous member supported on said inertia member, said inertia member comprising an inner float, an outer indicia carrying wall spaced from said float, vertical vanes and a horizontal vane interposed between said float and said wall, said horizontal vane substantially closing the space between said float and said wall.

WALTER McKAY.